(12) United States Patent
Vidal et al.

(10) Patent No.: US 11,042,472 B2
(45) Date of Patent: Jun. 22, 2021

(54) AUTHORING AUTOMATED TEST SUITES USING ARTIFICIAL INTELLIGENCE

(71) Applicant: Sauce Labs Inc., San Francisco, CA (US)

(72) Inventors: Fernando Vidal, Oakland, CA (US); Benjamin H. Ellis, Emeryville, CA (US); Bradley Scott Adelberg, Portola Valley, CA (US)

(73) Assignee: Sauce Labs Inc., San Francisco, CA (US)

( * ) Notice: Subject to any disclaimer, the term of this patent is extended or adjusted under 35 U.S.C. 154(b) by 0 days.

(21) Appl. No.: 16/566,764

(22) Filed: Sep. 10, 2019

(65) Prior Publication Data

US 2021/0073110 A1    Mar. 11, 2021

(51) Int. Cl.
*G06F 9/44*    (2018.01)
*G06N 20/00*    (2019.01)
(Continued)

(52) U.S. Cl.
CPC ......... *G06F 11/3684* (2013.01); *G06N 20/00* (2019.01); *G06F 8/355* (2013.01); *G06F 11/2635* (2013.01); *G06F 11/3457* (2013.01); *G06F 11/3664* (2013.01); *G06F 11/3688* (2013.01); *G06F 11/3692* (2013.01)

(58) Field of Classification Search
CPC ............. G06F 11/3684; G06F 11/3664; G06F 11/3692; G06F 11/3457; G06F 11/2635; G06F 11/3688; G06F 11/34; G06F 8/30; G06F 8/10; G06F 8/355; G06N 20/00
See application file for complete search history.

(56) References Cited

U.S. PATENT DOCUMENTS

| | | | | |
|---|---|---|---|---|
| 6,088,690 A | * | 7/2000 | Gounares | G06N 3/126 706/13 |
| 6,282,527 B1 | * | 8/2001 | Gounares | G06N 3/126 706/13 |

(Continued)

FOREIGN PATENT DOCUMENTS

DE    10 2012 223 587    7/2014

OTHER PUBLICATIONS

Xun Yuan et al., Using GUI Run-Time State as Feedback to Generate Test Cases, 2007 IEEE, [Retrieved on Feb. 22, 2021], Retrieved from the internet: <URL: https://dl.acm.org/doi/pdf/10.1109/ICSE.2007.94> 10 Pages (1-10) (Year: 2007).*

(Continued)

*Primary Examiner* — Anibal Rivera
(74) *Attorney, Agent, or Firm* — Weaver Austin Villeneuve & Sampson LLP

(57) ABSTRACT

Methods and apparatus are described by which artificial intelligence (AI) is used to enable the rapid development of reliable test suites for web and mobile applications. An AI agent guided by reinforcement learning explores an application-under-test (AUT), interacting with the AUT to traverse the flows through the AUT by seeking novel application states. A subset of these flows is then identified as being representative of the functionality of the AUT. The interactions between the AI agent and the AUT that define these identified flows form the basis for the test suite.

31 Claims, 10 Drawing Sheets

(51) Int. Cl.
  *G06F 11/36* (2006.01)
  *G06F 8/35* (2018.01)
  *G06F 11/263* (2006.01)
  *G06F 11/34* (2006.01)

(56) References Cited

U.S. PATENT DOCUMENTS

| | | | | |
|---|---|---|---|---|
| 8,325,880 | B1* | 12/2012 | Pelland | H04M 3/242 |
| | | | | 379/10.03 |
| 8,799,720 | B2* | 8/2014 | Lau | G06F 11/3688 |
| | | | | 714/46 |
| 8,826,084 | B1* | 9/2014 | Gauf | G06F 11/3688 |
| | | | | 714/46 |
| 9,075,914 | B2* | 7/2015 | Huggins | G06F 11/3664 |
| 9,170,847 | B2* | 10/2015 | Huggins | G06F 9/5055 |
| 9,778,916 | B2* | 10/2017 | Weigert | G06F 8/10 |
| 9,983,984 | B2* | 5/2018 | Rahulkrishna | G06F 11/3688 |
| 10,073,763 | B1* | 9/2018 | Raman | G06F 11/3664 |
| 10,430,323 | B2* | 10/2019 | Raman | G06N 20/00 |
| 10,452,523 | B1* | 10/2019 | Vijayalekshmi | G06F 11/3684 |
| 10,552,299 | B1* | 2/2020 | Surace | G06F 11/3672 |
| 10,576,380 | B1* | 3/2020 | Beltran | A63F 13/67 |
| 10,678,666 | B1* | 6/2020 | Gauf | G06F 11/2635 |
| 10,684,942 | B2* | 6/2020 | Dermer | G06F 11/3688 |
| 10,684,943 | B2* | 6/2020 | Fei | G06F 11/3684 |
| 2007/0101196 | A1* | 5/2007 | Rogers | G06F 11/3688 |
| | | | | 714/38.14 |
| 2011/0307867 | A1* | 12/2011 | Murthy | G06F 11/3684 |
| | | | | 717/125 |
| 2013/0055194 | A1* | 2/2013 | Weigert | G06F 8/355 |
| | | | | 717/104 |
| 2013/0055195 | A1* | 2/2013 | Weigert | G06F 8/30 |
| | | | | 717/104 |
| 2015/0363304 | A1* | 12/2015 | Nagamalla | G06F 11/3692 |
| | | | | 702/123 |
| 2016/0196021 | A1* | 7/2016 | Rahulkrishna | G06F 11/3688 |
| | | | | 715/760 |
| 2017/0052877 | A1* | 2/2017 | Ganda | G06F 3/0484 |
| 2017/0289008 | A1* | 10/2017 | Lau | G06F 11/3457 |
| 2018/0173606 | A1* | 6/2018 | Malla | G06F 11/3688 |
| 2018/0197103 | A1* | 7/2018 | Petursson | G06N 20/00 |
| 2018/0239961 | A1* | 8/2018 | Ekambaram | G06K 9/00335 |
| 2018/0349256 | A1* | 12/2018 | Fong | G06F 40/35 |
| 2019/0179732 | A1* | 6/2019 | Venkatasubramanian | |
| | | | | G06N 3/006 |
| 2019/0196948 | A1* | 6/2019 | Raman | G06N 20/00 |
| 2019/0213115 | A1* | 7/2019 | Takawale | G06F 8/30 |
| 2019/0266076 | A1* | 8/2019 | Maliani | G06F 11/3688 |
| 2019/0279696 | A1* | 9/2019 | Kim | G11C 8/12 |
| 2019/0340512 | A1* | 11/2019 | Vidal | G06F 11/3688 |
| 2020/0019492 | A1* | 1/2020 | Fei | G06N 20/00 |

OTHER PUBLICATIONS

Xun Yuan et al., Generating Event Sequence-Based Test Cases Using GUI Runtime State Feedback, Oct. 30, 2009, [Retrieved on Nov. 22, 2016], Retrieved from the internet: <URL: https://ieeexplore.IEEE.org/stamp/stamp.jsp?tp=&arnumber=5306073> 15 Pages (81-95) (Year: 2009).*
U.S. Appl. No. 15/916,136, filed Mar. 8, 2018, Bromann et al.
U.S. Appl. No. 15/973,019, filed May 7, 2018, Vidal et al.
U.S. Appl. No. 16/410,778, filed May 13, 2019, Vidal et al.

* cited by examiner

SAUCELABS

Run History

| Run Date | App | Screens Tested | Failed Screens | Status | |
|---|---|---|---|---|---|
| 2019-02-23 11:23:23 | SauceDemo.com | 13 | 2 | Fail | ↻ |
| 2019-02-20 11:25:21 | SauceDemo.com | 13 | 0 | Pass | ↻ |
| 2019-02-18 11:25:01 | SauceDemo.com | 13 | 0 | Pass | ↻ |

FIG. 6C

AUTHORING AUTOMATED TEST SUITES USING ARTIFICIAL INTELLIGENCE

BACKGROUND

The testing of software applications is a critical bottleneck in the pipeline between developers and end users. The diversity of devices, operating systems, and web browsers, coupled with the rapid pace at which new versions of each become available, makes it difficult to ensure compatibility and reliable operation of a new application with a significant portion of the possible combinations in a timely manner.

While the proliferation of automated testing tools and platforms has been helpful in this regard, most test suites are authored manually in a process characterized by its own inefficiencies. The typical test suite authoring process involves a group of quality assurance (QA) engineers mapping a set of flows through the application-under-test (AUT) for which they want to confirm expected behavior. The engineers pick what they consider to be the most important flows and manually code scripts that follow those flows. Not only is this approach labor intensive, it necessarily leaves many of the possible flows through the AUT untested. Moreover, each time the code of the AUT is updated, the test suite must be manually updated through the same process to capture the new behaviors of the AUT.

SUMMARY

According to various implementations, methods, apparatus, systems, platforms, and computer program products are provided that support automated testing of applications. According to various implementations, access information for an application under test (AUT) is received. The AUT encodes a plurality of application flows. Each application flow includes a sequence of application states. Each sequence of application states includes one or more target application states. Each of a subset of the application flows is traversed by performing a corresponding sequence of interactions with the AUT to induce the corresponding sequence of application states. A feature set representing each of at least some of the application states encountered during traversal of the application flows is extracted. The target application states for the application flows are clustered into a plurality of clusters based on a similarity measure. The similarity measure for each pair of the target application states is based on the corresponding feature sets. At least one target application state is selected from each of the clusters thereby resulting in a plurality of selected target application states. A test is generated for the AUT for each of the selected target application states. Each test is based on the sequence of interactions used to traverse the application flow for the corresponding selected target application state.

According to a particular implementation, traversing each of the application flows is accomplished by selecting the interactions with the AUT that are likely to induce the application states not previously encountered. According to one more specific implementation, selecting the interactions with the AUT is based on maximizing a reward for inducing the application states not previously encountered. According to a second more specific implementation, it is determined that a first application state has not been previously encountered based on the corresponding feature set.

According to a particular implementation, traversing each of the application flows is constrained by a flow budget that specifies a time limit or a limit on a number of the interactions with the AUT for each of the application flows.

According to a particular implementation, a first target application state is sampled multiple times to identify features for exclusion from the feature set corresponding to the first target application state. According to a more specific implementation, the feature set corresponding to the first target application state represents a set of assertions for the test corresponding to the first target application state. According to an even more specific implementation, user input regarding a testable element of the first target application state is received. The user input is integrated into the set of assertions for the test.

According to a particular implementation, an application map is generated for the AUT that represents relationships among the application states based on the interactions. Generating the test for the AUT for a first selected target application state includes identifying a shortest path through the application map to the first selected target application state.

According to a particular implementation, traversing a first one of the application flows includes requesting input data in connection with a first application state. According to a more specific implementation, traversing the first application flow includes traversing the first application flow from the first application state in a manner that favors using the input data.

According to a particular implementation, a first interaction with the AUT includes a plurality of user-specified actions in connection with a first application state.

According to a particular implementation, the AUT is a web application configured to interact with a web browser, or a native application configured for operation with an operating system of a mobile device.

According to a particular implementation, analytics data for the AUT are received. The analytics data represent use of the AUT by a population of users. Traversing each of the application flows is accomplished by selecting the interactions with the AUT based, at least in part, on the analytics data.

According to a particular implementation, user input representing a manually authored application flow are received. An additional test for the AUT is generated based on the manually authored application flow.

A further understanding of the nature and advantages of various implementations may be realized by reference to the remaining portions of the specification and the drawings.

BRIEF DESCRIPTION OF THE DRAWINGS

FIGS. 6A-6E are screenshots illustrating various interfaces associated with a particular implementation.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes techniques that use artificial intelligence (AI) to enable the rapid development of reliable test suites for web and mobile applications. An AI agent explores an application-under-test (AUT), interacting with the AUT to traverse most if not all of the possible flows through the AUT. A subset of these flows is then identified as being representative of the functionality of the AUT. The interactions between the AI agent and the AUT that define these identified flows form the basis for the test suite. As will be appreciated from this disclosure, not only is this approach far more efficient than the conventional manual approach to building a test suite, it also supports the kind of continuous testing that has become critical to the software industry.

According to a particular class of implementations, a machine-learning (ML) approach called reinforcement learning is used to govern the way in which the AI agent explores an environment, i.e., an AUT. "Reinforcement learning" refers to machine learning techniques in which software agents take actions in an environment to maximize some kind of cumulative reward. The environment is typically formulated as a Markov decision process (MDP). The focus of reinforcement learning is to find a balance between exploration of the environment and exploitation of the agent's current knowledge.

Figure 1:
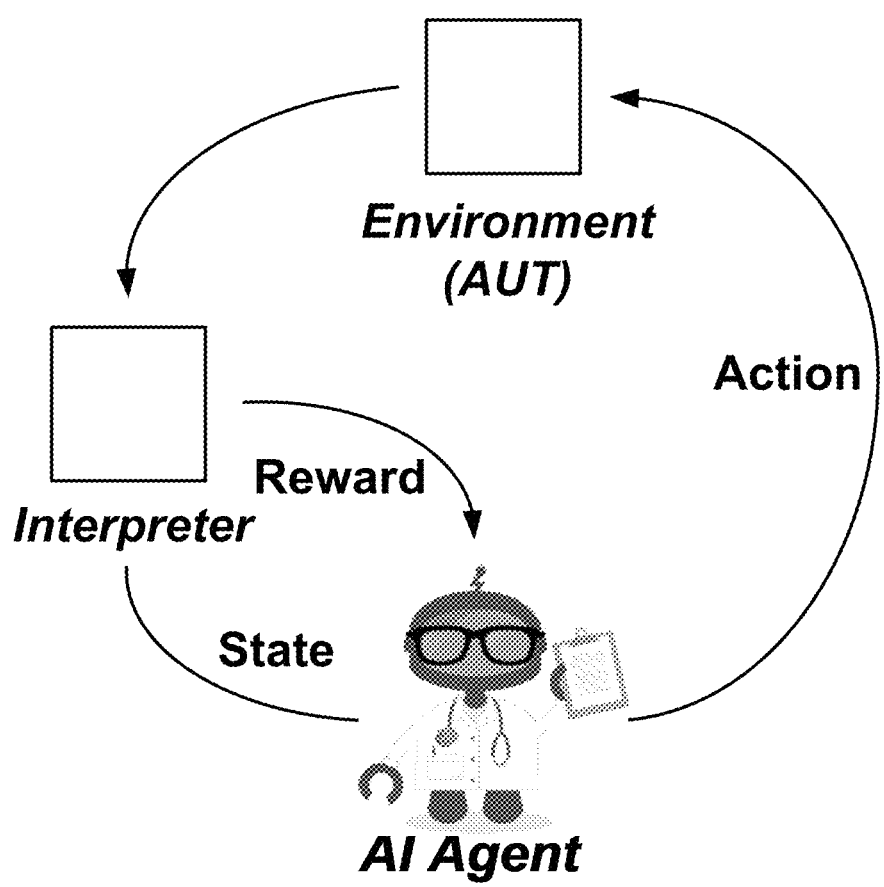
FIG. 1 is a diagram illustrating reinforcement learning.

As illustrated in FIG. 1, the AI agent takes actions in the environment that maximize rewards. Rewards are primarily based on an interpreter identifying novelty, i.e., the occurrence and/or magnitude of unexpected behavior produced by a particular action taken by the AI agent in relation to a current state of the AUT. Unlike the behavior of a conventional web crawler that randomly clicks on links on a web page, this incentivized exploration tends to guide the AI agent to unexplored areas of the AUT. Effectively, the agent learns that an action that hasn't been attempted is likely to lead to novelty. Once an action has been taken, the AI agent is much less likely to try that action again, instead spending resources on exploring possible actions that have not yet been tried. In this way, domain knowledge is made statistical. If an action leads to something the model didn't expect, the AI agent is rewarded for that. But once a result is captured, the reward for performing that action is reduced or eliminated, correspondingly reducing the agent's tendency to spend resources on that action when it encounters that state (or similar states) again.

According to some implementations, some rewards may also or alternatively be based on how the behavior of the AI agent conforms to typical or expected user behavior. Such behavior may be derived from analytics data (e.g., Google Analytics) that represents use of a version of the AUT or another similar application by a population of users. A QA engineer would be able to upload analytics data to the test generation platform, and that data could be used to guide and reward the AI agent when, for example, the agent attempts interactions with the AUT that are similar to what users actually do. Such analytics data may be used in conjunction with other measures of novelty as described herein.

Figure 2:
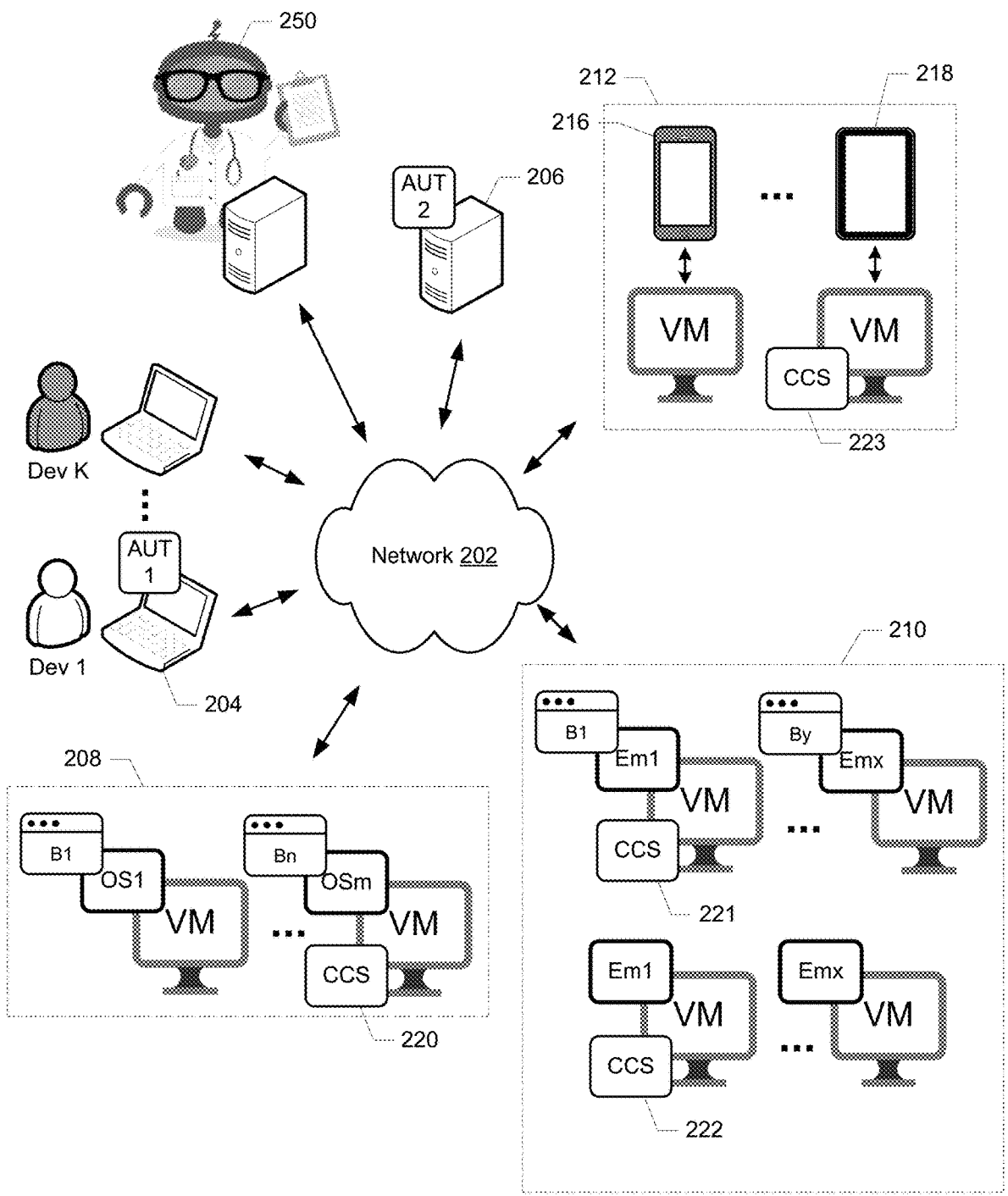
FIG. 2 is a simplified diagram of a computing system in which implementations enabled by the present disclosure may be practiced.

FIG. 2 depicts an example of a computing environment in which application developers and/or QA engineers generate test suites in accordance with the techniques described herein, and test their applications using resources on a cloud-hosted testing platform via network 202. Developers Dev 1 through Dev K represent a diverse community that may include anything from an individual developer on a single laptop to a team of developers on a wide area network at a large enterprise. The applications under test (AUTs) may reside on the same machine with which the developer is interacting with the test platform (e.g., as represented by AUT 1 on laptop 204), or on a separate machine (e.g., as represented by AUT 2 on server 206). The AUTs may be hosted in the public cloud with minimal security, or behind the enterprise-grade security of an enterprise network.

The virtual and hardware resources of the application testing platform are depicted in FIG. 2 as being include in resource pools 208-212. Resource pool 208 represents resources for testing web applications on potentially hundreds of browser and operating system (OS) combinations as represented by various combinations of browsers B1-Bn and operating systems OS1-OSm on corresponding virtual machine (VM) instances. These VM instances may represent, for example, Windows, Mac, and Linux-based machines to name some representative examples.

Resource pool 210 represents resources for testing mobile web applications on potentially hundreds of mobile browser and mobile device emulator combinations as represented by various combinations of mobile browsers B1-By and emulators Em1-Emx on corresponding VM instances, and resources for testing native mobile applications on potentially hundreds of mobile device emulators as represented by emulators Em1-Emx on corresponding VM instances. The depicted emulators may represent, for example, iOS Simulators and Android Emulators to name some representative examples. And while the emulators are shown as operating on corresponding VMs, the developer will typically primarily interact with or automate on the emulators.

Resource pool 212 represents resources for testing both mobile web applications and native mobile applications on potentially hundreds of hardware mobile device types as represented by smart phone 216 and tablet 218 and the corresponding VM instances that manage the interaction with a corresponding mobile device during testing. The depicted devices may represent, for example, physical phones or tablets for Android and iOS to name some representative examples.

It should be noted that the test platform of FIG. 2 and other examples described herein show the use of VMs for exemplary purposes. It will be understood that other mechanisms for providing isolation among applications operating in a shared computing environment are contemplated to be within the scope of the present disclosure. Such other mechanisms include, for example, containers such as those provided by Docker, Inc., or CoreOS, Inc., both of San Francisco, Calif. The present disclosure will refer generally to VMs, containers, and other suitable mechanisms for providing isolation among applications in a computing environments as "virtual computing environment instances" or "VCEs." The present disclosure should therefore not be limited by reference to specific examples using VMs.

The platform supports a wide range of application testing use cases. A single developer might use the platform to manually run a single test of an AUT with one combination of testing resources. At the other end of the scale, a team of developers associated with a large enterprise can implement an automated testing framework at scale, running multiple tests of multiple AUTs on many different combinations of testing resources simultaneously. And depending on the AUT and the goals of a particular test, there may be one or many instances of the AUT with which the platform interacts for that test. The platform may also include control/capture services (e.g., CCS's 220-223 operating on respective VMs) that are capable of connecting with, exerting varying degrees of control over, and/or capturing state information from the platform's testing resources and/or the AUTs for correlation with other test-related information.

The test platform of FIG. 2 may also include or connect with AI agents (e.g., AI agent 250) that may be used by developers and or QA engineers in authoring test suites to test their AUTs with the platform's resources. AI agent 250 might use any of a variety of automation drivers to interact with web or mobile applications including, for example, Selenium and WebDriver for web applications, and Appium, Espresso, XCUItest (Xcode), and Robotium for mobile applications. For example, AI agent 250 might spin up a Selenium driver using the platform's computing resources to interact with a web application. AI agent 250 might also interact directly with a browser or AUT without an intervening driver. Whatever the interaction mechanism, driver type, or testing framework, AI agent 250 issues a command for interacting with the AUT and then, once that command is executed, AI agent 250 queries the state of the AUT induced by the execution of the command. This state may include not only conventional test results, but any information relating to the induced state of the AUT including, for example, state information captured by a CCS (220-223) and/or other correlated test information.

As will be appreciated, the depiction of resource pools 208-212 is for illustrative purposes. More generally, the application testing platform may conform to any of a wide variety of architectures including, for example, one or more platforms deployed at one or more co-locations, each implemented with one or more servers. Network 202 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. The computing devices with which developers connect to the testing platform may be any suitable device capable of connecting to network 202 and interacting with the testing resources.

Some implementations enabled by the present disclosure are based on computing models that enable ubiquitous, convenient, on-demand network access to both virtual and hardware resources from one or more shared pools of computing resources (e.g., mobile devices, virtual machines, containers, emulators, networks, servers, storage, applications, services, etc.). Virtual resources are thoroughly torn down or wiped and hardware resources thoroughly wiped once testing is complete to ensure the security of each developer's data. As will be understood, such computing resources may be integrated with and/or under the control of the same entity controlling the testing platform. Alternatively, such resources may be associated with other platforms that are at least partially controlled by other entities, e.g., a platform under control of a separate provider of cloud services and/or computing resources with which the testing platform and/or the developer connects to consume resources as needed. In another example, a developer or an enterprise might run their own cloud or cluster of computing devices such as, for example, a Kubernetes cluster, the documentation for which is distributed by the Linux Foundation®. Based on the foregoing, the diversity of variations within the scope of this disclosure will be appreciated by those of skill in the art.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Figure 3:
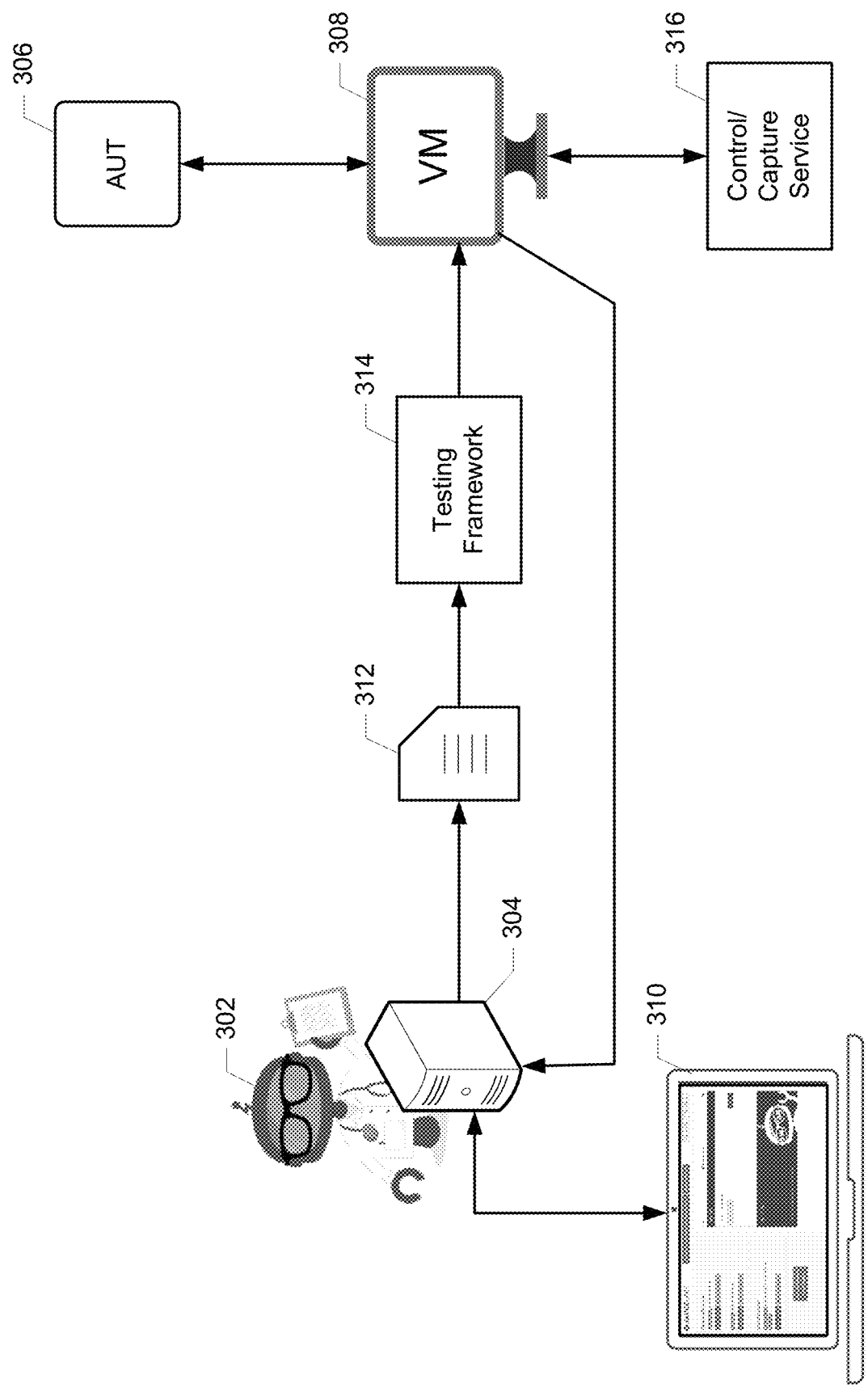
FIG. 3 illustrates examples of interactions between an artificial intelligence (AI) agent and an application under test (AUT).

Referring now to the diagram of FIG. 3, an AI agent 302 (e.g., on server 304) interacts with an AUT 306 using test resource(s) 308 of a testing platform (depicted in FIG. 3 as a VM instance). In response to the developer identifying the AUT (e.g., by providing a URL in a test interface on laptop 310) and initiating test suite generation, AI agent 302 and test resources 308 are allocated to that developer's AUT. AI agent 302 issues test commands 312, and the test commands are applied to AUT 306 via VM instance 308 using any of a variety of automation software and/or testing frameworks (e.g., 314) including, for example, various automation drivers, e.g., Selenium and WebDriver for web application testing, and Appium, Espresso, XCUItest (Xcode), and Robotium for mobile application testing. In some cases, AI agent 302 may interact directly with a browser or AUT.

The test commands are sent to the selected resources via a secure, two-way proxy server connection (e.g., a secure HTTP tunnel). There are also secure two-way connections via proxy servers from the selected testing resources to the AUT, wherever that resides. For example, if the AUT is a web application, VM instances with various browser/OS combinations specified by the developer are allocated from a pool or, if not available, instantiated. Secure HTTP tunnels to both the AI agent and the AUT are established for each VM. In the context of web application testing, Selenium commands issued by the AI agent are applied (e.g., via an external driver) to each browser via one tunnel, and the browser then interacts with the AUT in a corresponding way via the other tunnel. As will be appreciated, while the use of highly secure connections may be preferable in some circumstances, implementations are contemplated in which different levels of security are used.

The results of the application of the test commands are captured for transmission back to the AI agent for processing (as described below). The captured information may include the command and responses (e.g., from Selenium or Appium logs), as well as video or screen shots of the browser UI and/or AUT after each page-altering command. In the context of web applications, the captured information might also include the HTML of a web page. In the context of native applications for mobile devices, the captured information might include state data and elements with which the AI agent can interact as inferred from an XML document extracted from the automated execution environment, e.g., details about the geometry and contents of elements on the screen. These test results may also be supplemented with additional information captured via another connection.

For example, and as illustrated in FIG. 3, a control/capture service (CCS) 316 may be allocated to interact with the AUT and/or the allocated testing resources (e.g., the VM instance, container, browser, OS, emulator, mobile device, etc.) via another two-way connection to exercise control over and/or capture information from the testing resource(s) in a way that does not significantly interfere with the application of the test commands to the AUT. For the purpose of clarity, CCS 316 is shown in the figure as being distinct from VM instance 308. However, it should be noted that, while such implementations are contemplated, implementations are also contemplated in which CCS 316 operates on the VM instance. Depending on the testing context, a wide variety of information relating to the application of a test command may be captured by CCS 316.

For example, browser testing involves the execution of commands within a browser using, for example, an open source framework and the appropriate automation driver. In conjunction with this, and without interfering with the application of the test commands, a control/capture service (e.g., CCS 316) may leverage browser APIs to connect to the browser over a TCP interface defined in the dev tools protocol of the browser. Using this connection, the CCS may control use of the tools in specified ways, and capture information relating to any of the information generated or made accessible by the browser engine using the dev tools interface defined by the dev tools protocol, e.g., back-end calls and responses, browser performance, memory usage, security audits, DOM tree snapshots, etc. The information captured can also include information made available by the VM or container itself such as, for example, CPU or memory usage, traffic across the NIC, etc. That is, in addition to conventional (e.g., Selenium-based) testing, the CCS allows access to browser features or VM/container information in an automated way that allows more customized control of the browser or VM/container, and the collection of a much richer information set in connection with the test commands being executed.

In another example, the AUT is a native application for a mobile device, the testing resource of the testing platform is the operating system of an actual hardware mobile device interacting with a VM instance or an emulator of a mobile device operating system on a VM instance, and the testing framework is an open source framework using Appium. The basic approach discussed above for browsers can be used to capture state information about a native application under test, whether the test resources correspond to an actual hardware mobile device or an emulator. Some automated test results can be acquired from the Appium logs. In addition, a CCS can facilitate generation and capture of a richer data set (e.g., CCS 316) using integration tools that enable integration with OS automation engines such as, for example, those provided by Google (for Android) and Apple (for iOS).

Regardless of the testing context, a CCS or the equivalent may be employed to enrich the information set returned to the AI agent in response to the application of each test command to the AUT. For more information about suitable control/capture services that may be used in conjunction with the techniques described herein, please refer to U.S. patent application Ser. No. 15/916,136 entitled Automated Application Testing System filed on Mar. 8, 2018, the entire disclosure of which is incorporated herein by reference for all purposes.

A particular implementation for traversing the application flows of an AUT will now be described with reference to the flowchart of FIG. 4. It should be noted that the following description is by way of example, and that specific references to the testing of web applications should not be used to limit the scope of this disclosure which also includes, for example, the testing of mobile web and mobile native applications. It should also be noted that a wide variety of implementations are contemplated in which at least some of the functionality described herein may be performed by code that is working in conjunction with code that might be understood or interpreted to represent an AI agent. Thus, despite references to particular functions being performed by an AI agent, the scope of the present disclosure should not be interpreted based on such references to exclude implementations in which at least some of those or other functions may be performed by other code in the system. Similarly, despite references to particular functions being performed by code other than an AI agent, the scope of the present disclosure should not be interpreted to exclude implementations in which such functions are performed by the AI agent.

Figure 4:
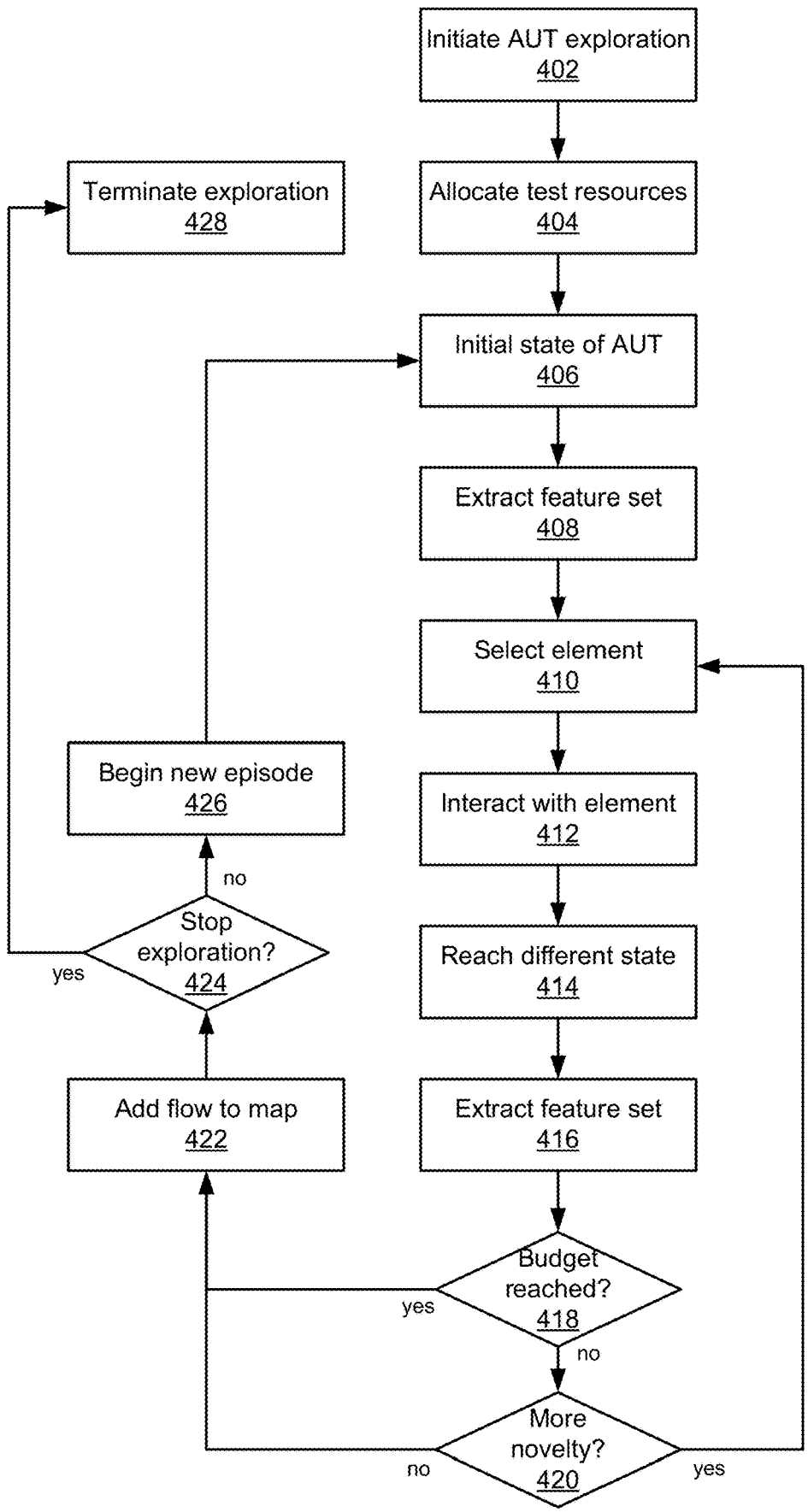
FIG. 4 is a flowchart illustrating exploration of an AUT according to a particular implementation.

Referring now to FIG. 4, a user of an automated test platform initiates exploration of an AUT as described herein by providing access information for the AUT (402) which might include, for example, a pointer to the AUT (e.g., a URL) or the code of the AUT itself (e.g., uploaded to the platform). Platform resources are allocated to the user's test suite generation (404). This might include, for example, an instance of a virtual computing environment (e.g., a virtual machine) configured with an appropriate operating system and potentially other software, e.g., a browser. The resources might also include a control/capture service (CCS) configured to enrich the data captured from the AUT and/or other allocated resources as described above.

The allocated platform resources also include an AI agent configured to explore the flows through the AUT. The AI agent explores the AUT in a series of training episodes in which the AI agent traverses as many application flows as it can find to discover new unique application states. The AI agent begins at an initial state of the AUT (406), extracts a feature set representing the initial state (408), and begins traversing an application flow by selecting an element of the current AUT state to interact with (410). As will be discussed in greater detail below, the AI agent's selection of the element with which to interact is guided by a reinforcement learning approach in which novelty is rewarded.

The agent interacts with the selected element (412) to reach a different application state (414). The AI agent extracts a feature set from this application state (416) and the process continues until the AI agent reaches a specified budget for interactions for the current episode (418), or no new novel states are likely to be found (420). The AI agent then adds the application flow for the current episode to an application map (422). If exploration should terminate (424), e.g., no new application states are discovered or an exploration time period expires, the AI agent begins a new episode (426), returning to the initial state of the AUT. Otherwise, the AI agent's exploration of the AUT terminates (428).

As discussed above, the AI agent's selects an element of a particular AUT state with which to interact based on a reinforcement learning paradigm according to which the AI agent is rewarded for discovering novelty, e.g., new unique application states. The AI agent explores flows in training episodes, each of which may have a programmable budget for the number of interactions with the AUT. The budget may be large enough to ensure that anything interesting that might happen will likely happen within that budget. For example, the budget (e.g., 100-200 interactions) might be based on the typical flow lengths associated with traditionally derived test suites.

When each episode finishes, the AI agent resets and goes back to the initial state of the AUT, e.g., the root URL of a web application. In some cases, the AI agent might end up back at the initial state of the AUT before it reaches its budget for that episode. In such a case, the agent may continue exploring. For example, the agent might try an interaction for which it got a high reward the last time it tried the interaction. If something different happens this time, then the AI agent might get similarly reward for the novelty. Alternatively, if the AI agent reaches a state that it has already encountered, it might receive no reward or even a punishment, in which case it is unlikely to try that interaction again.

The AI agent may be distinguished from a conventional web crawler (a bot that just clicks on links) in that, unlike a web crawler, the AI agent can handle application state changes while staying in the same URL. That is, the AI agent's exploration does not just follow links, but is able to interact with a broader range of elements on a page regardless of whether or not they lead to a new URL.

In some cases there may be a need for input from the user. That is, once the user provides the root URL of the AUT or the AUT code, the AI agent explores as best as it can without knowledge of any of the inputs the AUT might expect. However, it is contemplated that the AI agent will encounter "locked doors," i.e., application states that require input (also referred to herein as "test data") before the AI agent is allowed to continue to traverse the flow. For example, the AI agent might encounter a login page that requires login credentials from a registered user.

The AI agent makes no attempt to deduce the proper inputs when encountering such a situation. Instead, the AI agent surfaces encountered states that are candidates for the insertion of input by the user. This might include a message like, "We found this state. It is suggested that adding test data to this state will lead to more successful and complete exploration." Once the user provides the necessary input and exploration begins again, the AI agent is armed with the necessary input if and when it arrives at the same application state. In this approach, the user waits for the AI agent to ask for test data as it explores and through this iterative process the AI agent is able to complete the flows through the application.

So, for example, if the initial state of the application is a login page, the AI agent finishes exploring and surfaces that state to the user, in response to which the user will provide the necessary login credentials, and hit "explore" again. This time, the AI agent will encounter that same state (the login page), use the credentials to log in, and then explore until it completes all paths through the application and/or reaches additional locked doors.

Each time the agent encounters a locked door (e.g., a form of some kind that requires test data), that event is surfaced to the user who can decide at any point that the agent has reached enough interesting states and unlocked enough doors to move on with generating a test suite. However, it should be noted that this iterative feedback loop can continue arbitrarily.

In some cases, a different mode of exploration by the AI agent may occur in response to receiving test data, potentially reducing the time to find new states based on that data. For example, traversal of an application flow from an application state for which test data are requested might proceed preferentially in a way that favors use of the test data received. That is, if a user provides test data for a particular application state, a subsequent exploration episode might begin at or skip forward to that state and explore from that point forward rather than beginning a novelty-based exploration from the initial application state. Such exploration may be responsive to explicit user gestures or may be initiated by autonomous decisions of the AI agent. Such an approach might be particularly useful for helping the AI agent traverse a multi-step process, e.g., checkout.

Test data can inform the AI agent how to fill out forms that are encountered, but in principle it can include the user providing input on how to explore specific states. For example, a user can specify specific actions to be performed when a specific state or a type of state is encountered. That is, the AI agent might have user-specified or selected macros it performs when encountering specified states or state types. For example, this capability might be used to trigger record and playback functionality or locate and upload an attachment at such exploration points. In another example, a macro might be a sequence of actions to be performed in a particular application state, e.g., a macro called "Fill out form 123" might include the steps (1) click button 1, (2) click button2, and (3) check checkbox4. Such a set of actions may be provided as test data for a particular application state such that the whole sequence is treated as a single interaction with the AUT by the AI agent.

More generally, implementations are contemplated in which input from the user can range from minimal (e.g., fully automated except for surfacing locked door states) to very sophisticated in which the user is able to customize the flow at each stage. For example, user input might include identifying important paths ahead of time or after exploration, generating macros for specific states or types of states, specifying thresholds for novelty or clustering (see below), specifying agent exploration time limit, selecting representative states from clusters (see below), removing or adding tests from a proposed test suite, specifying the number of tests in the suite, specifying a time limit required to run a test suite (e.g., fast build vs. comprehensive build), etc.

The similarity of encountered application states to previously encountered states may be measured using application state representations derived from the feature sets extracted from each encountered state. As will be appreciated, a wide variety of approaches can be taken in representing states and identifying novelty. For example, features extracted from the current state can be represented as a vector, and that vector compared to one or more vectors representing previously encountered states, e.g., using a cosine similarity measure. If the new state is sufficiently different from previously encountered states, a reward would be given; if not, no reward or even a punishment might be given. Implementations are also contemplated in which the reward scales in relation to the degree of difference from previous state(s).

In the context of web application testing, the feature set for a web page can be a kind of template of the page based on the CSS class names included in the page. In another example, the geometry of the page can be leveraged by building a 3D model/topology of the elements of the page, resulting in a geometric fingerprint of the application state. Such a model might represents where each element is located in the 2D space of the page, with the third dimension representing the depth of each element in the DOM hierarchy.

In addition to approaches such as these, it may be important to include other information in the feature set. For example, some representation of the textual content of a page might be an important part of the feature set. For example, word embedding based on the text of the page might be used (e.g., vector features representing how often certain sequences of characters or certain tags appear), which are techniques used in natural language processing applications. One approach might determine whether the text on a page is substantially similar to the text on the last page, e.g., when the AI agent clicked on a page element, did that precipitate a significant change in the text on the page, and so represent a high degree of novelty? Natural language processing techniques to represent the semantics of the text in an application state might also be leveraged.

As will be appreciated, and depending on the type of application being tested, there is a great diversity of features, combinations of features, and representations of features that may be used to represent an application state. The scope of the present disclosure should therefore not be limited to the examples described herein.

According to various implementations enabled by the present disclosure, because the AI agent is greedy for novelty in the way it traverses the application flows of an AUT, it identifies flows more efficiently than the conventional manual approach. And as it does so, it builds an application map, e.g., a list of state IDs and a transition matrix. Each time the AI agent encounters an application state, it assigns an ID to the state, associates the extracted features and other data (e.g., a screenshot) with that ID, and updates a transition matrix that represents the transition to that state and the interaction that induced the transition.

According to some implementations, the AI agent not only identifies application flows and the interactions that enable traversal of those flows, it also builds a profile of one or more target states of the application associated with each flow. For example, an application flow might include interfaces in which a user adds an item to a cart, presses a checkout button, enters billing and shipping information, and presses a "finalize order" button, in response to which an interface is presented that indicates "your order has been placed." This last interface might be designated as the target state of that application flow. That target application state is defined in terms of its expected behavior and becomes a testable state, i.e., an application state that is looked for when a test performs the same sequence of interactions with the AUT. In some cases, there may be one or more intermediate states within a flow that are also target application states. For example, in the example described above, it may be desirable that one or more of the intermediate interfaces that are part of the checkout flow be included as a target application state. In such a case, the tests relating to such intermediate interfaces may be subsets of longer tests sequences. For example, a flow that adds an item to a cart, goes to the payment page, and then arrives at the confirmation page might include three separate tests. One tests the functionality of adding an item to the cart. The second might test that the payment page is reached. And the third would find assertions on the confirmation page. The scope of the present disclosure should therefore not be limited with reference to specific examples in which a target application state is at the end of a flow.

In this way, the AI agent builds up a set of the application states that are consistent across the same sequence of interactions. That is, if a particular sequence of interactions consistently leads to a particular state that has particular properties, this is considered a reliable piece of functionality that can be tested and therefore form the basis for the criteria for a corresponding test passing.

Figure 5:
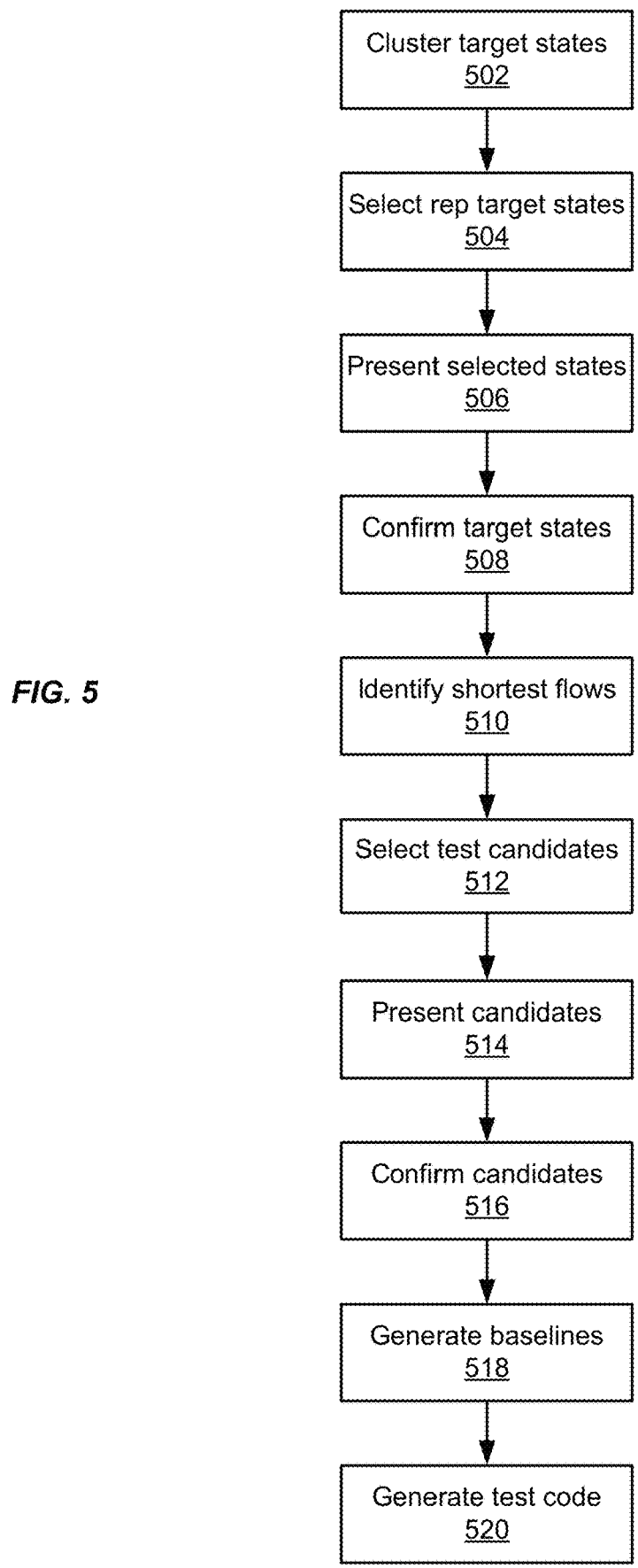
FIG. 5 is a flowchart illustrating creation of a test suite according to a particular implementation.

Not all of the application flows identified by an AI agent are typically worthy of including in a test suite. For example, there may be considerable overlap of the application flows with many of the flows including the same states. Therefore, according to various implementations, dimensionality reduction is performed on the flows to identify a subset of the application flows discovered during exploration of the AUT that broadly represents the overall functionality of the AUT. For example, the AI agent might identify many hundreds of application flows, many of which are close variations of each other. Dimensionality reduction might then involve picking a representative subset of these (e.g., a few dozen) that are as orthogonal to each other as possible. A particular implementation in which the dimensionality reduction is performed on the target application states as representative of the application flows will now be described with reference to the flowchart of FIG. 5.

The target application states identified by the AI agent are clustered, grouping the target states together by some measure of similarity (502). As discussed above, the degree of similarity may be determined by comparing representations of the target states that are derived from the features extracted from those states. For example, the similarity between the vector representations of two target states may be determined using a cosine similarity measure for the two vectors.

A representative target application state is then selected from each cluster (504). This selection may be accomplished in a variety of ways. In one approach, the representative target state for each cluster may be selected at random. In another approach, the representative state may be the state closest to the center of the cluster. Regardless of how the representative states are selected, the set of selected states for all of the clusters may be surfaced to the user for confirmation (506). This would allow the user to confirm that the selected target states should be used as the basis for a test in the test suite or, alternatively, to propose alternate target states.

Once the set of target application states has been confirmed (508), the fastest or shortest application flow through the AUT to each of the target states is identified (510). According to a particular implementation, this is achieved using a graph traversal algorithm to traverse the application map constructed by the AI agent during exploration of the AUT (e.g., as described above with reference to FIG. 4). The sequence of interactions for the identified application flow is then selected as a candidate for being the basis for a test in the test suite (512). Again, the user may be given the opportunity to confirm the test candidates identified (514). This is to be contrasted with the conventional approach in which the user would have to manually identify the most important flows and then write code that is able to navigate each of those.

Once the test candidates are confirmed (516), a baseline representation of the target state for each test candidate is generated (518). As will be discussed, this involves generating one or more assertions based on the target state that will form the basis for reliably determining whether a particular test run passed or failed. Test code is derived for each test candidate (520). The test code embodies the sequence of interactions with the AUT for that flow, e.g., a collection of test scripts that perform the interactions of the sequence.

The tests generated as described above are intended to reach the corresponding target application states successfully. This implies a reliable way of determining whether that happened, i.e., whether the application state reached as a result of performing a test conforms to expected behavior. According to a specific class of implementations, this expected behavior is the baseline representation of the target state. But there are changes that can occur in a complex application that may not have relevance to this determination, e.g., certain kinds of dynamic content that change on a web page even though the URL does not change. Such dynamic content might include, for example, an ad, a date or time, marketing copy, etc. For example, the current level of the S&P500 is not a good assertion to rely on for a finance-related web page, but the text "S&P500" in a particular location on that page might be. As will be appreciated, it may therefore be undesirable to include certain kinds of dynamic information as part of the expected behavior for a test.

According to this class of implementations, elements that may not contribute or may detract from a target application state being a reliably testable state are filtered to generate a baseline representation for that target state. According to a specific implementation, each target state is sampled multiple times by reaching that target state multiple times using the same sequence of interactions with the AUT. The elements of that target state that change across multiple traversals are identified for exclusion from the baseline representation for that target state.

Similar to the identification of target states as being testable, in this context, the remaining elements associated with a target state are identified as being testable. These testable elements become part of the baseline for the target state; i.e., this particular target state, induced by this particular sequence of interactions with the AUT, includes this particular set of elements with these particular properties. This baseline is what is used to determine whether an application state reached during testing conforms to expected behavior.

In the context of web application testing, baselines may be thought of as analogous to Selenium testing assertions which conventionally include expected results from the DOM that are manually selected and coded by test engineers. Test engineers typically select these as a subset of the information in the page that they think is relevant to correctness. By contrast, because of the use of AI as described herein, a baseline can be far more comprehensive, potentially evaluating the entire DOM for differences (minus the elements that are filtered from the baseline).

According to some implementations, test engineers may be given the option of augmenting a baseline, e.g., by adding one or more user-defined assertions. This gives test engineers the opportunity to test for correctness in relation to elements that might not otherwise be captured automatically. For example, such an assertion might relate to the value of a user interface element that is visible to the user of the AUT and that depends on correct user interface logic, e.g., if the user provides a first and last name in corresponding fields in a web page, the default username in another field might automatically be set to first.last. Other examples include a certain cookie being set, certain values being present in the browser state (localstorage), certain calls to backend APIs returning an appropriate response, etc.

Once a baseline is established for each of the selected target application states, the test suite may be directly derived. That is, each test (sequence of interactions with the AUT) is derivable from the application flow corresponding to each selected target state, and the expected behavior for each test is the baseline for that target state. According to some implementations, the user might be given an opportunity designate one or more states (or such states might automatically be designated) that should always be considered a failure, e.g., an http error page. Such states might show up as navigation failures rather than content failures.

Figure 6A:
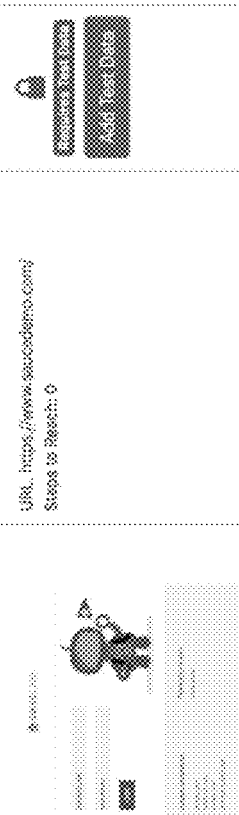

FIGS. 6A-6E are examples of screenshots with which a developer or QA engineer might interact when creating and running a test suite for a web application as enabled by the present disclosure. FIG. 6A depicts an interface in which the tests currently included in the test suite are presented. In the depicted implementation, for each test the interface presents a screenshot of the corresponding target application state, metadata about the target state (e.g., the URL), whether or not the test requires "test data," the number of similar target states (e.g., in that state's cluster), and the number of elements tested (assertions) in the baseline for that target state.

Figure 6B:
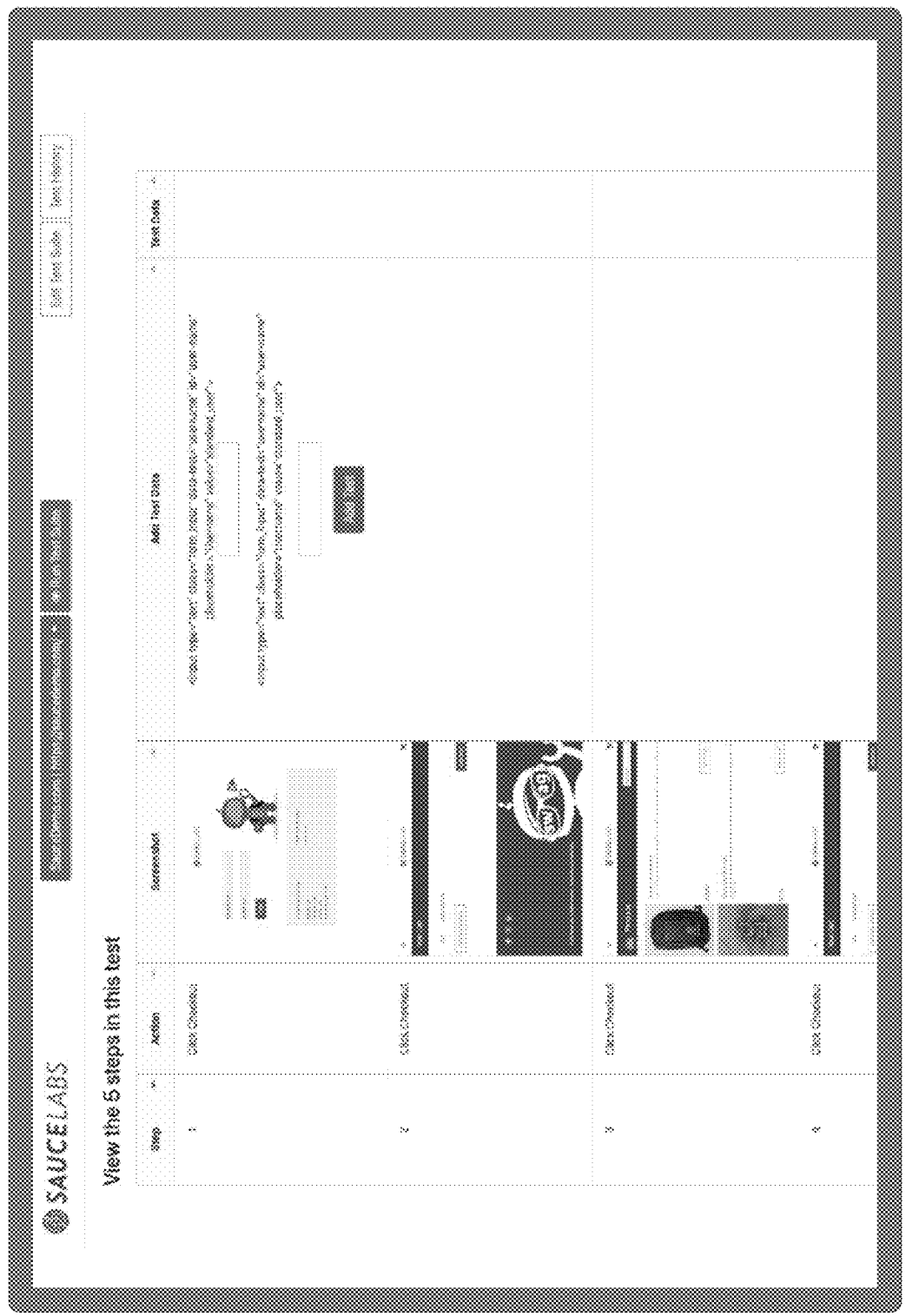
Figure 6D:
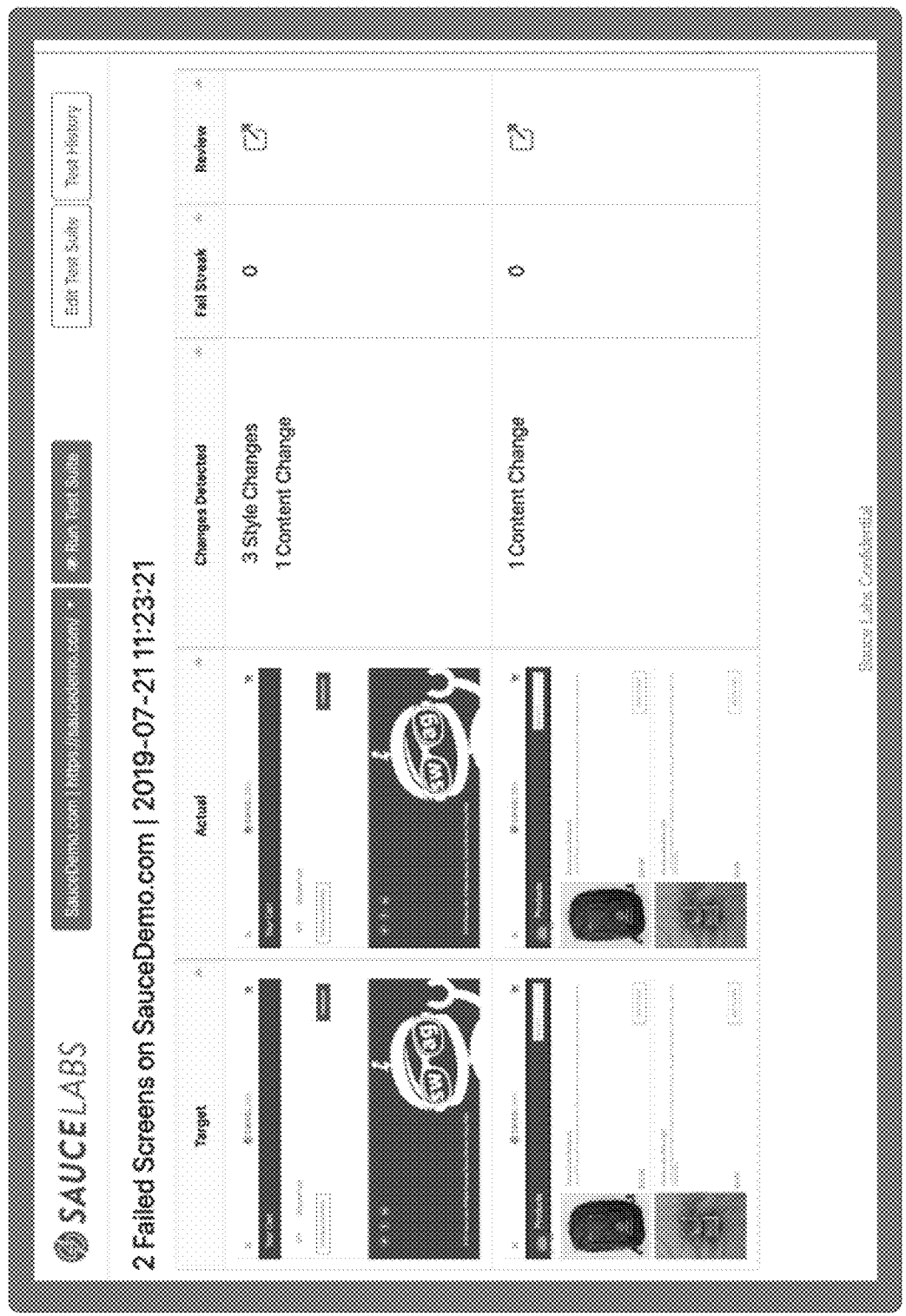
Figure 6E:
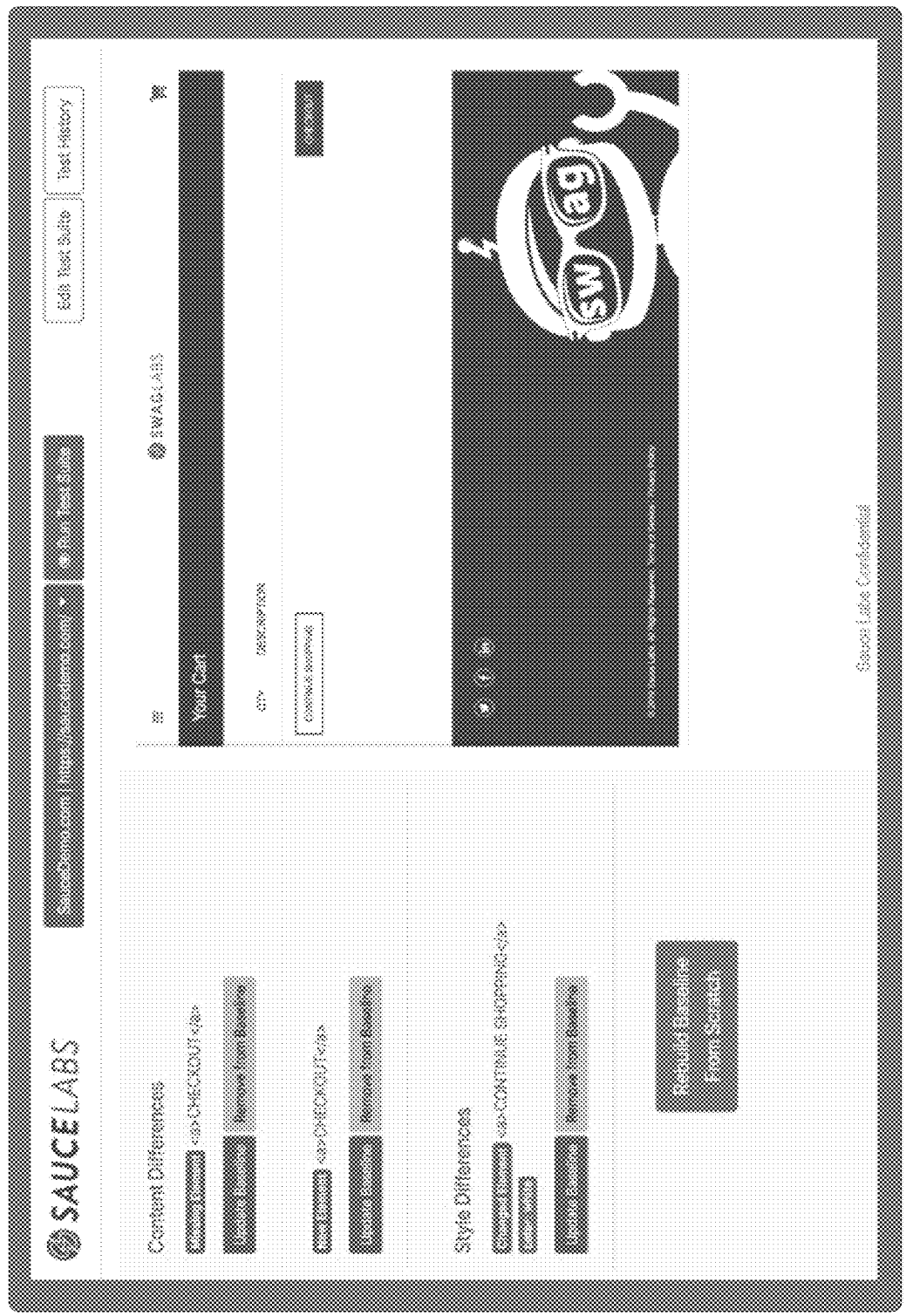

The user can select a particular test in the interface of FIG. 6A to review the steps (interactions with the AUT) for that test as depicted in FIG. 6B. In the depicted implementation, the interface includes screen shots of the application states that result from each step. The depicted interface also indicates where test data are required to complete that test step, and provides interface elements (e.g., text boxes) in which the user may enter the test data.

After the interactive authoring stage, the user may use the test suite like any other automated test suite, i.e., the test suite could become part of their build pipeline. Each run of the test suite is a forward pass through the defined sequences of interactions with the AUT, followed by assertion checks and reports of "pass" or "fail" relative to the elements included in each baseline. A history of three test runs of the same AUT (SauceDemo.com) is shown in the interface of FIG. 6C in which the most recent run on Jul. 21, 2019 resulted in two failures. Details for the two failures are provided in the interface of FIG. 6D.

As depicted, a failed test run will surface each application state for which content and/or style differences from the baseline are detailed, e.g., specific missing elements, new elements, or changed elements are identified. Upon viewing these results, a user might agree that a true failure is represented and fix the code to address that error. According to a particular implementation illustrated in the interface of FIG. 6E, the user can accept the result as the new expected behavior (by selecting "Update Baseline" for one or more of the identified elements), in which case the baseline is modified to reflect the feedback. The user might instead identify something that was supposed to have changed (e.g., dynamic content) and so shouldn't be part of the baseline (by selecting "Remove from Baseline" for that element), in which case the baseline is updated to integrate that feedback. The user might also choose to "Rebuild Baseline From Scratch" which might be a suitable alternative where, for example, the number and types of changes involve too many of the elements associated with that application state. The user may also go back to editing the test suite from any of the interfaces depicted in FIGS. 6A-6E.

According to various implementations, the model of the AUT constructed using an AI agent may be used to generate test scripts in any standard test framework (e.g., Selenium, Appium, etc). This gives the test engineer flexibility in terms of whether and where to execute specific tests, as well as the ability to refine specific test manually. Baselines and actions may be mapped onto an underlying testing framework in a variety of ways. For example, in some cases it might be advisable to select only a sample of the possible baseline comparisons to avoid test bloat that might cause the test to run slowly.

In another example, the manner in which test scripts are generated might be made to mimic human authoring so that the resulting test suite can more easily be maintained by test engineers. This might involve, for example, identifying common flows and generating reusable code for such flows. In another example, if one or more baselines change as a result of user interaction or further training of the AI agent, the test engineer might be given the option to regenerate the entire suite, or only the delta, i.e., the portion(s) of the suite or portion(s) of individual test(s) within the suite affected by the baseline changes. The latter approach could be advantageous in cases where, for example, a test engineer has modified the suite in some way in that at least a portion of the changes made might not be overwritten.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method, comprising:
receiving access information for an application under test (AUT), the AUT encoding a plurality of application flows, each application flow including a sequence of application states, each sequence of application states including one or more target application states;
traversing each of a subset of the application flows by performing a corresponding sequence of interactions with the AUT to induce the corresponding sequence of application states, each sequence of interactions with the AUT including application of test commands that cause execution of code of the AUT;
extracting a feature set representing each of at least some of the application states encountered during traversal of the application flows;
clustering the target application states for the application flows into a plurality of clusters based on a similarity measure, the similarity measure for each pair of the target application states being based on the corresponding feature sets;
selecting at least one target application state from each of the clusters thereby resulting in a plurality of selected target application states; and
generating a test for the AUT for each of the selected target application states, each test being based on the sequence of interactions used to traverse the application flow for the corresponding selected target application state.

2. The method of claim 1, wherein traversing each of the application flows is accomplished by selecting the interactions with the AUT that are likely to induce the application states not previously encountered.

3. The method of claim 2, wherein selecting the interactions with the AUT is based on maximizing a reward for inducing the application states not previously encountered.

4. The method of claim 2, further comprising determining that a first application state has not been previously encountered based on the corresponding feature set.

5. The method of claim 1, wherein traversing each of the application flows is constrained by a flow budget that specifies a time limit or a limit on a number of the interactions with the AUT for each of the application flows.

6. The method of claim 1, further comprising sampling a first target application state multiple times to identify features for exclusion from the feature set corresponding to the first target application state.

7. The method of claim 6, wherein the feature set corresponding to the first target application state represents a set of assertions for the test corresponding to the first target application state.

8. The method of claim 7, further comprising:
receiving user input regarding a testable element of the first target application state; and
integrating the user input into the set of assertions for the test.

9. The method of claim 1, further comprising generating an application map for the AUT that represents relationships among the application states based on the interactions, and wherein generating the test for the AUT for a first selected target application state includes identifying a shortest path through the application map to the first selected target application state.

10. The method of claim 1, wherein traversing a first one of the application flows includes requesting input data in connection with a first application state.

11. The method of claim 10, wherein traversing the first application flow includes traversing the first application flow from the first application state in a manner that favors using the input data.

12. The method of claim 1, wherein a first interaction with the AUT includes a plurality of user-specified actions in connection with a first application state.

13. The method of claim 1, wherein the AUT is a web application configured to interact with a web browser, or a native application configured for operation with an operating system of a mobile device.

14. The method of claim 1, further comprising receiving analytics data for the AUT, the analytics data representing use of the AUT by a population of users, wherein traversing each of the application flows is accomplished by selecting the interactions with the AUT based, at least in part, on the analytics data.

15. The method of claim 1, further comprising:
receiving user input representing a manually authored application flow; and
generating an additional test for the AUT based on the manually authored application flow.

16. A system, comprising one or more computing devices having one or more processors and memory configured to:
receive access information for an application under test (AUT), the AUT encoding a plurality of application flows, each application flow including a sequence of application states, each sequence of application states including one or more target application states;
traverse each of a subset of the application flows by performing a corresponding sequence of interactions with the AUT to induce the corresponding sequence of application states, each sequence of interactions with the AUT including application of test commands that cause execution of code of the AUT;
extract a feature set representing each of at least some of the application states encountered during traversal of the application flows;
cluster the target application states for the application flows into a plurality of clusters based on a similarity measure, the similarity measure for each pair of the target application states being based on the corresponding feature sets;
select at least one target application state from each of the clusters thereby resulting in a plurality of selected target application states; and
generate a test for the AUT for each of the selected target application states, each test being based on the sequence of interactions used to traverse the application flow for the corresponding selected target application state.

17. The system of claim 16, wherein the one or more processors and memory of the one or more computing devices are configured to traverse each of the application flows by selecting the interactions with the AUT that are likely to induce the application states not previously encountered.

18. The system of claim 17, wherein the one or more processors and memory of the one or more computing devices are configured to select the interactions with the AUT by maximizing a reward for inducing the application states not previously encountered.

19. The system of claim 17, wherein the one or more processors and memory of the one or more computing devices are further configured to determine that a first application state has not been previously encountered based on the corresponding feature set.

20. The system of claim 16, wherein the one or more processors and memory of the one or more computing devices are configured to traverse each of the application flows as constrained by a flow budget that specifies a time limit or a limit on a number of the interactions with the AUT for each of the application flows.

21. The system of claim 16, wherein the one or more processors and memory of the one or more computing devices are further configured to sample a first target application state multiple times to identify features for exclusion from the feature set corresponding to the first target application state.

22. The system of claim 21, wherein the feature set corresponding to the first target application state represents a set of assertions for the test corresponding to the first target application state.

23. The system of claim 22, wherein the one or more processors and memory of the one or more computing devices are further configured to:
   receive user input regarding a testable element of the first target application state; and
   integrate the user input into the set of assertions for the test.

24. The system of claim 16, wherein the one or more processors and memory of the one or more computing devices are further configured to generate an application map for the AUT that represents relationships among the application states based on the interactions, and wherein the one or more processors and memory of the one or more computing devices are configured to generate the test for the AUT for a first selected target application state by identifying a shortest path through the application map to the first selected target application state.

25. The system of claim 16, wherein the one or more processors and memory of the one or more computing devices are configured to traverse a first one of the application flows by requesting input data in connection with a first application state.

26. The system of claim 16, wherein the one or more processors and memory of the one or more computing devices are configured to traverse the first application flow by traversing the first application flow from the first application state in a manner that favors using the input data.

27. The system of claim 16, wherein a first interaction with the AUT includes a plurality of user-specified actions in connection with a first application state.

28. The system of claim 16, wherein the AUT is a web application configured to interact with a web browser, or a native application configured for operation with an operating system of a mobile device.

29. The system of claim 16, wherein the one or more processors and memory of the one or more computing devices are further configured to receive analytics data for the AUT, the analytics data representing use of the AUT by a population of users, wherein the one or more processors and memory of the one or more computing devices are configured to traverse each of the application flows by selecting the interactions with the AUT based, at least in part, on the analytics data.

30. The system of claim 16, wherein the one or more processors and memory of the one or more computing devices are further configured to:
   receive user input representing a manually authored application flow; and
   generate an additional test for the AUT based on the manually authored application flow.

31. A computer program product, comprising one or more non-transitory computer-readable media having computer program instructions stored therein, the computer program instructions being configured such that, when executed by one or more computing devices, the computer program instructions cause the one or more computing devices to:
   receive access information for an application under test (AUT), the AUT encoding a plurality of application flows, each application flow including a sequence of application states, each sequence of application states including one or more target application states;
   traverse each of a subset of the application flows by performing a corresponding sequence of interactions with the AUT to induce the corresponding sequence of application states, each sequence of interactions with the AUT including application of test commands that cause execution of code of the AUT;
   extract a feature set representing each of at least some of the application states encountered during traversal of the application flows;
   cluster the target application states for the application flows into a plurality of clusters based on a similarity measure, the similarity measure for each pair of the target application states being based on the corresponding feature sets;
   select at least one target application state from each of the clusters thereby resulting in a plurality of selected target application states; and
   generate a test for the AUT for each of the selected target application states, each test being based on the sequence of interactions used to traverse the application flow for the corresponding selected target application state.

* * * * *